United States Patent Office 3,585,670
Patented June 22, 1971

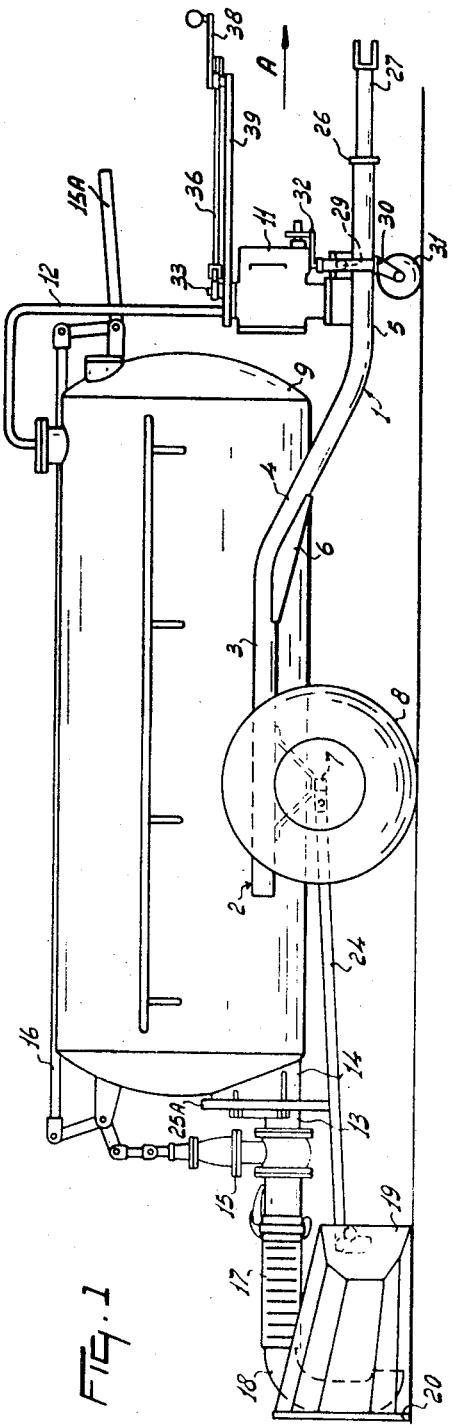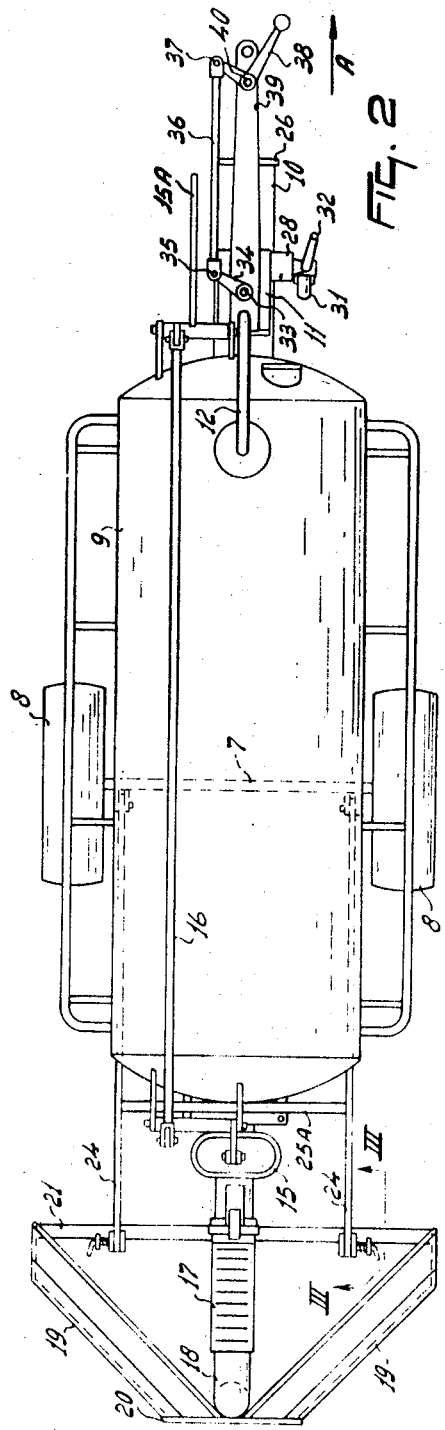

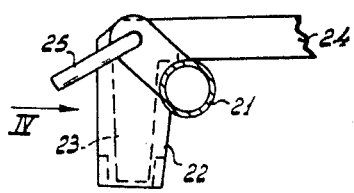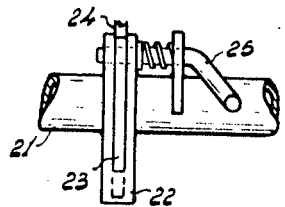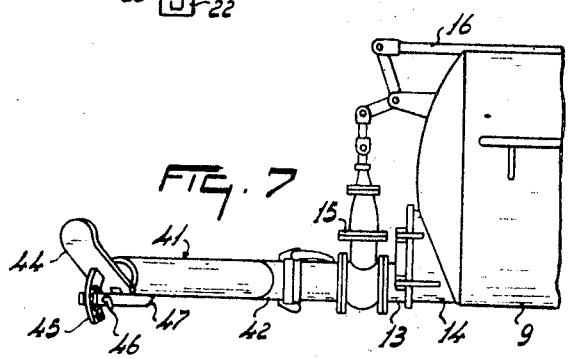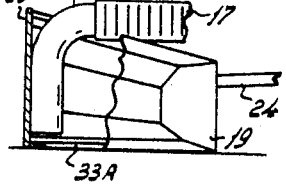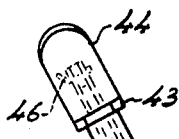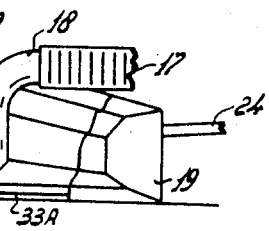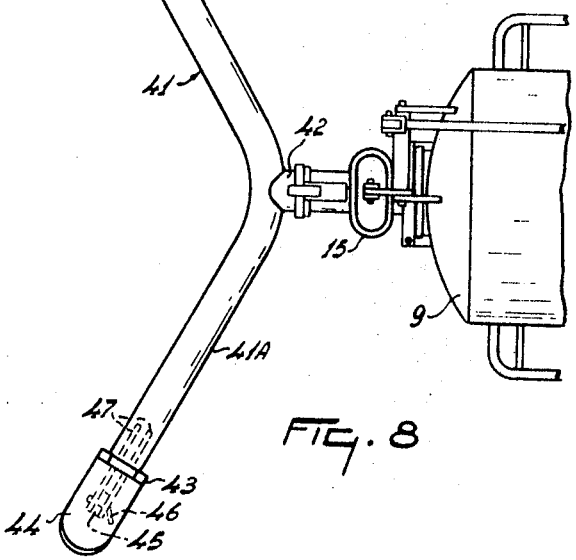

3,585,670
AGRICULTURAL IMPLEMENTS FOR THE COLLECTION AND TRANSPORT OF LIQUID AND SEMI-LIQUID MATERIALS
Ian Archie MacKinnon, Burlington, Ontario, Canada, assignor to Lely Ltd., Burlington, Ontario, Canada
Filed Sept. 16, 1968, Ser. No. 759,920
Claims priority, application Netherlands, Sept. 14, 1967, 6212561
Int. Cl. A01c 3/04
U.S. Cl. 15—93　　　　　　　　　　　　　　9 Claims

ABSTRACT OF THE DISCLOSURE

A manure collector and spreader having a suction pipe at the apex of the V-shaped scraper which is carried by a mobile tank, the suction pipe being detachably connected to a pipe extending from the lower part of the tank and the scraper also having a rapid detachable mounting relative to the tank. In place of the suction pipe a spreading means may be attached to the pipe leading from the manure tank, such spreading means comprising a V-shaped pipe with deflectors at both outer ends of the pipe. An air pump is connected to the tank so that selectively its suction and discharge can be applied to the tank in order to create a pressure or partial vacuum in the tank as desired.

SUMMARY OF THE INVENTION

This invention relates to agricultural implements for the collection and transport of liquid and semi-liquid materials, and which include a frame movable over the ground, the frame carrying a tank for material to be transported and also a pump.

According to the invention, an implement of such character is provided which includes a scraper adapted for collecting liquid or semi-liquid material from the ground or from floors and the like, and also which includes a suction pipe opening in the vicinity of the scraper and arranged to receive material collected by the scraper for removal to the tank.

BRIEF DESCRIPTION OF THE DRAWINGS

For a better understanding of the invention, and to show how the same may be carried into effect, reference will now be made, by way of example, to the accompanying drawings, in which FIG. 1 is a side elevation of an agricultural implement in accordance with the invention;

FIG. 2 is a plan view of the implement of FIG. 1;

FIG. 3 is a fragmentary sectional view, to an enlarged scale, taken on the line III—III of FIG. 2;

FIG. 4 is a view as seen in the direction indicated by the arrow IV of FIG. 3;

FIG. 5 is a side elevation of an alternative construction of certain parts at the rear of the implement of FIGS. 1 and 2;

FIG. 6 corresponds to FIG. 5 but shows a further alternative construction;

FIG. 7 is a side elevation of the rear of the implement of FIGS. 1 and 2, said implement being provided with parts for spreading material over the ground; and FIG. 8 is a plan view corresponding to FIG. 7.

DESCRIPTION OF THE PREFERRED EMBODIMENTS

Referring to FIGS. 1 to 4 of the drawings, the implement illustrated is intended for use in the collection, transportation and subsequent spreading of liquids and semi-liquids such as organic farmyard manure, sludge and the like, although it should be appreciated that the implement can be used, if required, with liquids such as water and aqueous solutions of artificial and other inorganic fertilizers.

The implement has a frame which is generally indicated by the reference numeral 1, said frame extending in the same general direction as the intended direction of travel of the implement which is indicated by an arrow A in FIGS. 1 and 2 of the drawings. The frame 1 includes two main frame beams 2, each beam having an upper substantially horizontal portion 3 and a lower substantially horizontal portion 5, and said two portions being integrally interconnected by inclined portions 4 that are bent over downwardly from the leading ends of the portions 3 towards a vertical plane parallel to the direction A which contains the longitudinal axis of the implement. The two lower substantially horizontal portions 5 extend parallel to one another in closely neighboring relationship. Generally triangular strengthening plates 6 are secured to the two beams 2 at the junctions between the portions 3 and 4 thereof. Brackets project downwardly from the upper substantially horizontal portions 3 of the frame beams 2 and have a horizontal axle 7 secured to them so as to extend perpendicular to the direction A. Large ground wheels 8 are rotatably mounted at opposite ends of the axle 7.

A cylindrical storage tank 9 is supported by the portions 3 of the frame beams 2 in such a way that its longitudinal axis extends substantially parallel to the direction A. A horizontal plate 10 is secured to the portions 5 of the frame beam 2 in front of the tank 9 and a double-acting pump 11 is mounted thereon. A pipe 12 leads from the pump 11 to the interior of the tank 9 and said pump is provided with a cock 33 which can be moved to either one of two alternative positions. In one such position the delivery or pressure side of the pump 11 is in communication with pipe 12 and in the other of which the input or vacuum side of the pump 11 is in communication with pipe 12. The rear end of the tank 9 has a hand hole or manhole 14 provided with a pivotable cover formed with an opening 13 which may serve as either an inlet or outlet. The opening 13 communicates by way of a shut-off valve 15 and a flexible hose 17 with a suction pipe 18. The valve 15 can be opened or closed from the front of the implement with the aid of an operating lever 15A which is linked to said valve 15 by a pivotal rod and lever system 16 which may be of known or other suitable construction which would occur to one skilled in the art.

The suction pipe 18 is mounted between two scraper blades 19, these blades 19 extending forwardly from the pipe 18 in shallow V-shaped relationship as seen in plan view. Each blade 19 is approximately C-shaped in vertical cross-section with the concave side of the C facing forwardly with respect to the direction A. The neighboring ends of the two blades 19 and the suction pipe 18 itself are all secured to a plate 20 that extends perpendicularly transverse to direction A. It can be seen from FIG. 1 of the drawings that the suction pipe 18 extends downwardly across the plate 20 but has its lowermost end formed so that the opening thereof faces forwardly from the plate 20 with respect to the direction A. The leading ends of the two scraper blades 19 are interconnected by a tubular beam 21 which extends horizontally perpendicular to the direction A and carries, at two relatively spaced points along its length, a pair of holders 22 (FIGS. 3 and 4) that receive the downwardly bent-over ends 23 of corresponding arms 24. The two arms 24 extend approximately parallel to the direction A and their leading ends are pivotally connected to lugs carried by the axle 7. As can be seen best in FIGS. 3 and 4 of the drawings, spring-loaded horizontal locking pins 25 can be entered through aligned openings in the walls of the holders 22, and through a registering opening in the end 23 of the corresponding arm 24 to retain said ends 23 in said holders 22. The two arms 24 are interconnected at points along their lengths by a bracket 25A which arches over the hand hole or manhole 14 of the tank 9.

The leading ends of the lower substantially horizontal portions 5 of the main frame beams 2 are rigidly interconnected by a transverse plate 26 from which a draw bar 27 projects horizontally forwardly in the direction A. The leading end of the draw bar 27 carries a fork having vertically spaced horizontal limbs intended for connection to the tow bar or hitch of an agricultural tractor or other towing vehicle. A beam 28 of rectangular shape is secured to the portions 5 of the frame beams 2 so as to extend horizontally perpendicular to the direction A. A support 29 projects horizontally to one side of the implement therefrom and a substantially vertical shaft 30 carrying the horizontal axle of a castor ground wheel 31 at its lowermost end is turnable relative thereto. The level of the axle of the small castor ground wheel 31 relative to the remainder of the frame can be adjusted in known or other suitable manner with the aid of a screw-threaded spindle having a manually operable handle 32 at its uppermost end.

The aforementioned cock is pivotable about a substantially vertical axis and carries a horizontally projecting arm 34 the free end of which is connected by a vertical pivot pin 35 to one end of a coupling rod 36 which extends horizontally forward from the arm 34 in the direction A. The leading end of the coupling rod 36 is pivotally connected by a further vertical pin to the free end of one arm of a tumbler or control lever 38, said lever 38 being turnably mounted on the leading end of a support 39 by a vertical pivot pin 40. The support extends horizontally forward from the top of the pump 11 and it will be noted that the four pivots which are afforded by the parts 33, 35, 37 and 40 are located at the four corners of a parallelogram linkage which can be angularly adjusted by the forwardly projecting arm of the tumbler or control lever 38 to turn the cock 33 and open the interior of the tank 9 to either the pressure or the vacuum side of the pump 11.

FIG. 5 of the drawings shows an alternative embodiment of the collecting parts of the implement in which the lowermost edges of the two scraper blades 19 are interconnected by a horizontal plate 33A having a knife-like leading edge (not shown). The lowermost end of the suction pipe 18 is not bent over forwardly as shown in FIG. 1 of the drawings, but opens in a horizontal plane immediately above a rearmost region of the plate 33A.

FIG. 6 of the drawings shows an embodiment which is very similar to that of FIG. 5 except that, in this case, the plane of the opening at the lowermost end of the suction pipe 18 is inclined at an angle of approximately 45° to the horizontal and to the vertical, the lowermost point of said mouth being substantially coincident with the rearmost edge of the plate 33A and the plane of the mouth being inclined upwardly away from that point and forwardly therefrom relative to the direction A.

In the use of the implement which has been described, the leading end of its draw bar 27 is connected to the tow bar or hitch of an agricultural tractor or other towing vehicle and a rotary input shaft of the pump 11 is placed in driven connection with the power take-off shaft of the same tractor or other vehicle by way of a transmission shaft (not shown) having universal joints at its opposite ends. The implement is towed in the direction A by the tractor or other vehicle to a place where appreciable quantities of liquid or semi-liquid organic manure are lying, such as a concrete-covered farmyard, for collection by the implement. The shut-off valve 15 is opened and the cock 33 is placed in the position in which the pipe 12 will be connected to the input or vacuum side of the pump 11.

Upon moving the implement over the manure-covered yard or other location, the scraper blades 19 direct said manure towards the mouth of the suction pipe 18 and the manure is sucked into the tank 9 by way of the pipe 18, hose 17, valve 15 and opening 13. If the manure to be collected is mainly in a thick or semi-liquid form, it is usually best to use the collection parts which are illustrated in FIGS. 1 and 2 of the drawings. If, on the other hand, the manure is mainly in a wholly liquid form, it is usually better to employ the parts illustrated in FIG. 5 or FIG. 6 of the drawings so that said manure, which collects in the form of a thin layer on the top of the plate 33A, is sucked therefrom into the pipe 18.

As soon as all the manure has been collected, or the tank 9 is full, the cock 33 is placed in an intermediate position in which the pipe 12 is shut off from the pump 11 and the valve 15 is closed. The pump 11 can then be turned off. It will be noted that both the operating lever 15A and the tumbler or control lever 38 can be reached from the driving seat of an agricultural tractor that is towing the implement. The scraper blades 19, plate 20, suction pipe 18 and flexible hose 17 can be removed by disconnecting the hose 17 from the inlet-outlet pipe of the shut-off valve 15 with the aid of a releasable connection which may be of known or other suitable construction within the skill of the art, and by withdrawing the locking pins 25 to enable the ends 23 of the arms 24 to be withdrawn from the holders 22. The arched bracket 25A engages the hand hole or manhole 14 and prevents the arms 24 from turning downwardly about their pivotal connections with the axle 7 to a point at which they would touch the ground.

The implement may be transported by a tractor or other vehicle to a place at which the liquid or semi-liquid manure is to be spread over the ground such as, purely for example, an orchard. FIGS. 7 and 8 of the drawings show a spreading member 41 which is particularly suitable for use in orchards or other locations at which plants are growing in well-spaced rows. As can be seen in FIG. 8 of the drawings, the spreading member 41 is of shallow V-shaped configuration when seen in plan view, the point of the V being foremost with respect to the direction A. A short pipe 42 projects forwardly from the point of the V and is adapted to be joined to the rearmost end of the shut-off valve 15 by way of the aforementioned releasable connection of known or other suitable construction. The pipe 42 opens into a shallow V-shaped tube 41A at the point thereof. The opposite ends of the tube 41A carries parts located outside the path of travel of the implement as defined by the points of contact of its wheels 8 with the ground. Substantially horizontal pivot pins 43 are mounted at the lower sides of the opposite end mouths of the tube 41A and symmetrically identical deflector plates 44, the shapes of which can be seen from the drawings, are hingeably connected to the tube 41A by means of said pins 43. Strips 47 are secured to the lowermost sides of the two limbs of the tube 41A so as to extend parallel to the lengths of those limbs and curved plates 45, secured to the lowermost sides of the deflector plates 44, are entered between the free ends of each pair of strips 47. The free ends of the strips 47 are formed with horizontally aligned holes and each curved plate 45 is formed with a curved row of holes that are equidistant from the corresponding pin 43. Substantially horizontal locking pins 46 are provided for entry through the holes in the strips 47 and a chosen one of the holes in each plate 45 to retain the deflector plates 44 in corresponding angular settings about the pins 43.

Upon placing the cock 33 in the position in which the pipe 12 is in communication with the delivery or pressure side of the pump 11 and opening the shut-off valve 15, the liquid or semi-liquid manure in the tank 9 is forced out of the mouths formed at the opposite ends of the tube 41A. The deflector plates 44 cause the manure to issue in fan-shaped sprays and said sprays can be caused to cover a larger, or smaller, area, at will, by appropriate angular adjustment of the deflector plates 44 about the pivot pins 43.

The implement which has been described can be of considerable value in keeping farmyards, cattle sheds and other places where farmyard livestock gather, in a clean condition. The spreading member described with reference to FIGS. 7 and 8 of the drawings is of value in distributing farmyard manure in orchards and the like, but it is emphasized that the spreading member 41 has been described purely by way of example and that other forms of spreading members, not particularly adapted for use in orchards and the like, can equally well be used with an implement in accordance with the invention.

Having thus described my invention, what I claim as new and desire to secure by Letters Patent of the United States is:

1. An agricultural implement for the collection and transport of liquid and semi-liquid material comprising a frame movable over the ground, said frame supporting a tank for material to be transported and a pump connected to said tank to evacuate and pressure air, a scraper associated with said implement for collecting liquid and semi-liquid material from the ground and said scraper having two blades disposed in V-shaped relationship when seen in plan view, a substantially horizontal plate extending from the V point of said blades towards the front of said scraper, a suction pipe positioned on said implement to withdraw material collected by said scraper and conduct said material into said tank, said suction pipe having a receiving mouth located immediately above said plate and between the front edge of said plate and the V point formed by said blades, the outlet of said pipe communicating with the interior of said tank through an opening.

2. An implement as claimed in claim 1, wherein said receiving mouth is disposed adjacent and faces towards the front of said scraper.

3. An implement as claimed in claim 1, wherein said receiving mouth is positioned to be inclined to said plate.

4. An implement as claimed in claim 3, wherein the plane of said receiving mouth is inclined from the rear of said scraper and forwardly towards the front of said scraper.

5. An implement as claimed in claim 1, wherein said scraper is positioned at the rear of said implement with respect to the direction of travel whereby the blades converge towards the rear.

6. An implement as claimed in claim 1, wherein said scraper includes upright plate means of approximately C-shaped configuration when seen in cross-section, the concave side of the C being directed forwardly of said implement with respect to the direction of travel.

7. An implement as claimed in claim 1, wherein said scraper is pivotally connected to the rear of said implement by arms, said arms being pivotable about an axis extending substantially horizontally and said arms being perpendicular to the direction of travel, two of said arms being located on opposite sides of said tank, said arms carrying stop means adapted to limit downward movement thereof and each of said arms being coupled to said scraper by rapid detachable means.

8. An implement as claimed in claim 1, wherein said scraper is positioned centrally of said implement with respect to the longitudinal axis thereof and at the rear of said tank.

9. An implement as claimed in claim 1, wherein said scraper is of a width about the same as that of said tank.

References Cited

UNITED STATES PATENTS

| | | | |
|---|---|---|---|
| 900,870 | 10/1908 | Murphy | 239—172 |
| 1,747,793 | 2/1930 | Pounds et al. | 239—172X |
| 1,910,325 | 5/1933 | Finnell | 15—320 |
| 2,975,978 | 3/1961 | Propst | 239—148 |
| 3,007,191 | 11/1961 | Braun | 15—340 |
| 1,219,763 | 3/1917 | Pearce | 15—1.7 |
| 3,206,787 | 9/1965 | Daniels et al. | 15—353X |

FOREIGN PATENTS

| | | | |
|---|---|---|---|
| 6,919 | 3/1904 | Great Britain | 15—340 |

EDWARD L. ROBERTS, Primary Examiner

U.S. Cl. X.R.

15—328, 347, 374, 401